United States Patent [19]
Goto et al.

[11] Patent Number: 5,700,563
[45] Date of Patent: Dec. 23, 1997

[54] MAGNETIC RECORDING MEDIUM

[75] Inventors: Kazushige Goto; Takahiro Miyazaki, both of Miyagi, Japan

[73] Assignee: Sony Corporation, Tokyo, Japan

[21] Appl. No.: 790,427

[22] Filed: Jan. 29, 1997

[30] Foreign Application Priority Data

Jan. 31, 1996 [JP] Japan .................. P08-015966

[51] Int. Cl.⁶ ........................................ B32B 5/16
[52] U.S. Cl. ............... 428/328; 428/332; 428/694 BA; 428/694 BR; 428/694 T; 428/695; 428/900
[58] Field of Search ............... 428/694 T, 694 BR, 428/694 BA, 695, 328, 332, 900

*Primary Examiner*—Bernard Pianalto
*Attorney, Agent, or Firm*—Hill, Steadman & Simpson

[57] ABSTRACT

A magnetic recording medium having a magnetic layer formed by coating a non-magnetic support member with a magnetic coating material mainly composed of ferromagnetic iron alloy powder and a binding material, wherein the magnetic coating material includes ferromagnetic iron alloy powder containing Co by 6 to 30 atom %, Y by 1 to 6 atom % and Al by 10 to 15 atom % with respect to Fe and having an average major axis length of 0.06 μm to 0.20 μm, polyvalent carboxylic acid having a molecular weight of 300 or less or an anhydride of the polyvalent carboxylic acid, a binding material, and a lubricant, and the maxim diameter of pores in the magnetic layer is 10 nm to 30 nm.

2 Claims, 1 Drawing Sheet

MAGNETIC RECORDING MEDIUM

BACKGROUND OF THE INVENTION

1. Field of the Invention

The present invention relates to a so-called coating-type magnetic recording medium having a magnetic layer formed by coating a non-magnetic support member with a coating material mainly composed of ferromagnetic iron alloy powder and a binding material. More particularly, the present invention relates to a magnetic recording medium which is capable of improving dispersion properties of magnetic powder in a magnetic coating material thereof and electromagnetic conversion characteristic and the durability of the magnetic layer thereof.

2. Prior Art

A so-called coating-type magnetic recording medium, which has been widely used, has a magnetic layer formed by coating a non-magnetic support member made of a polyester film or the like with a magnetic coating material prepared by dispersing and kneading ferromagnetic iron alloy powder, a binding material, a dispersing agent, a lubricant and so forth.

A coating-type magnetic recording medium of the foregoing type has been attempted to be composed of further fined ferromagnetic iron alloy powder in order to improve the performance thereof so as to satisfy a requirement for performing a dense recording operation. Thus, ferromagnetic iron alloy powder of a type having a large specific surface has been employed.

On the other hand, fine particles of metal, for example, Fe, Ni, Co or the like, or their alloy each having an excellent magnetic characteristic has been employed as ferromagnetic metal powder.

In recent years, a requirement for further raising the recording density has been made. To satisfy the requirement above, a contrivance has been employed in which ferromagnetic iron alloy powder having a very small particle size and exhibiting an excellent magnetic characteristic is considerably dispersed in a binding material of the magnetic coating material so as to improve the surface characteristics of the magnetic layer in order to improve the electromagnetic conversion characteristic. Moreover, a magnetic recording medium of the foregoing type has been arranged to have the improved electromagnetic conversion characteristic and intended to have improved durability.

Hitherto, a variety of means have been employed in order to improve the dispersion properties of the ferromagnetic iron alloy powder. For example, a method has been employed in which the magnetic characteristic and the particle size of ferromagnetic iron alloy powder mainly composed of α-Fe are restricted so as to improve the dispersion properties of the ferromagnetic iron alloy powder and to make the ferromagnetic iron alloy powder to be adaptable to the magnetic recording operation using a short wavelength. Another method has been disclosed in Japanese Patent Laid-Open No. 6-36265, in which ferromagnetic iron alloy powder mainly made of Fe and containing Al or Si and rare earth elements is employed.

However, when ferromagnetic iron alloy powder of the foregoing type is intended to be dispersed in a magnetic coating material, excessively great cohesive strength of the ferromagnetic iron alloy powder inhibits satisfactory dispersion properties from being obtained. Accordingly, addition of a dispersing agent, such as lecithin and introduction of a polar group into the binding material have been performed.

If the dispersing agent, for example, lecithin, is added to the ferromagnetic iron alloy powder exhibiting an excellent magnetic characteristic and having a small particle size, unsatisfactory affinity between the dispersing agent and the binding material however results in the reinforcing effect being insufficient in their interface. As a result, the strength of the coating film, that is, the durability of the material deteriorates.

SUMMARY OF THE INVENTION

In view of the foregoing, an object of the present invention is to provide a magnetic recording medium having excellent dispersion properties of a magnetic coating material and including a material exhibiting an excellent electromagnetic conversion characteristic of a magnetic layer and sufficient durability even if ferromagnetic iron array powder exhibiting an excellent magnetic characteristic and having a small particle size is employed as magnetic powder thereof.

In order to achieve the foregoing object, a magnetic recording medium according to the present invention includes a magnetic layer formed by coating a non-magnetic support member with a magnetic coating material mainly composed of ferromagnetic iron alloy powder and a binding material, wherein the magnetic coating material includes ferromagnetic iron alloy powder containing Co by 6 to 30 atom %, Y by 1 to 6 atom % and Al by 10 to 15 atom % with respect to Fe and having an average major axis length of 0.06 µm to 0.20 µm, polyvalent carboxylic acid having a molecular weight of 300 or less or an anhydride of the polyvalent carboxylic acid, a binding material, and a lubricant, and the maxim diameter of pores in the magnetic layer is 10 nm to 30 nm.

If the ratio of each element contained in the ferromagnetic iron alloy powder according to the present invention with respect to Fe is out of the above-mentioned range, the magnetic characteristic of the ferromagnetic iron alloy powder deteriorates. If the average major axis length is longer than 0.20 µm, the material cannot be adaptable to a magnetic recording operation using a short wavelength. If the average major axis length is shorter than 0.06 µm, ferromagnetic iron alloy powder is easily and undesirable cohered.

If the molecular weight of the polyvalent carboxylic acid serving as the dispersing agent is larger than 300, the strength of the coating film forming the magnetic layer and made of the magnetic coating material deteriorates. Thus, the durability of the magnetic recording medium against a still-image maintaining operation deteriorates.

If the maximum diameter of pores in the magnetic layer is less than 10 nm, a satisfactorily large hole capacity cannot be obtained and therefore the lubricant cannot sufficiently be supplied to the surface. As a result, the durability against a still-image maintaining operation deteriorates. If the maximum diameter of pores is larger than 30 nm, magnetic powder cannot satisfactorily be enclosed into the magnetic layer and thus the magnetic characteristic deteriorates.

It is preferable that the magnetic recording medium according to the present invention has an arrangement such that the polyvalent carboxylic acid or the anhydride of the polyvalent carboxylic acid is contained by 1 to 5 parts by weight with respect to 100 parts by weight of the magnetic powder.

In the magnetic recording medium according to the present invention, if the quantity of the polyvalent (a valence of two or more) carboxylic acid or its anhydride included in the magnetic coating material and having a molecular weight of 300 or less is larger than 5 parts by weight, the electromagnetic conversion characteristic of the magnetic layer deteriorates and also the durability worsens. If the quantity of the foregoing magnetic layer is less than 1 part by weight or if it is omitted, the electromagnetic conversion characteristic of the magnetic layer deteriorates or satisfactory durability cannot be obtained.

The polyvalent (a valence of two or more) carboxylic acid having a molecular weight of 300 or less or its anhydride may be dicarboxylic acid having two carboxyl groups in the molecule thereof, tricarboxylic acid having three carboxyl groups in the molecule thereof or tetracarboxylic acid having four carboxyl groups in the molecule thereof.

The polyvalent (a valence of two or more) carboxylic acid having a molecular weight of 300 or less or its anhydride will specifically be described. The dicarboxylic acid is exemplified by saturated aliphatic dicarboxylic acid, such as oxalic acid, malonic acid, succinic acid, glutaric acid, adipic acid, pimelic acid, suberic acid, azelaic acid and sebacic acid; unsaturated aliphatic dicarboxylic acid, such as maleic acid and fumaric acid; and aromatic dicarboxylic acid, such as phthalic acid, isophthalic acid and terephthalic acid. The tricarboxylic acid is exemplified by citric acid, nitrilotriacetic acid and benzentricarboxylic acid. The tetracarboxylic acid is exemplified by benzentetracarboxylic acid.

It is preferable that at least a portion of the binding material in the magnetic coating material of the magnetic recording medium according to the present invention includes at least either of metallic salt group of sulfonic acid ($-SO_3M$, where M is alkali metal, such as Na or K) or metallic salt group of sulphuric acid ($-OSO_3M$, where M is alkali metal, such as Na or K or an alkali group) introduced thereto. It is preferable that the quantity of the metallic salt group be 0.2 to 0.8 μmol per 1 $m^2$ of the surface area.

As described above, the magnetic recording medium according to the present invention has the structure in which the non-magnetic support member is coated with the magnetic coating material having the ferromagnetic iron alloy powder dispersed in the binding material thereof. The binding material may be any one of resin materials usually included in the magnetic recording mediums of the above-mentioned type. Therefore, the type of the binding material is not limited.

The resin for preparing the binding material is exemplified by vinyl chloride-vinylacetate copolymer, vinyl chloride-vinylacetate-vinyl alcohol copolymer, vinyl chloride-vinylacetate-maleic acid copolymer, vinyl chloride-vinylidene chloride copolymer, vinyl chloride-acrylonitrile copolymer, acryl ester-vinylidene chloride copolymer, methacrylate-vinylidene chloride copolymer, methacrylate-styrene copolymer, thermoplastic polyurethane resin, polyvinyl fluoride, vinylidene chloride-aclylonitrile copolymer, butadiene-aclylonitrile copolymer, aclylonitrile-butadiene-methacrylate copolymer, polyvinylbutyral, polyvinylacetal, cellulose derivatives, styrene-butadiene copolymer, polyester resin, phenol resin, phenoxy resin, epoxy resin, thermosetting polyurethane resin, urea resin, melamine resin, alkyd resin and urea-formaldehyde resin.

The magnetic coating material of the magnetic recording medium according to the present invention may be added with an antistatic agent, such as carbon black, an abrasive material, such as alumina, a rust preventive material and so forth. The dispersing agent, the antistatic agent, the abrasive material and the rust preventive material may be any of known materials and no limitation is set.

Moreover, the non-magnetic support member of the magnetic recording medium according to the present invention is made of a material exemplified by polyester and aramid film, such as polyethylene terephthalate and polyethylene-2, 6-naphthalate film. The surface of the non-magnetic support member may be provided with an intermediate layer or an undercoating layer in order to improve the adhesive properties of the magnetic layer.

When the magnetic recording medium according to the present invention is manufactured, the ferromagnetic iron alloy powder and the polyvalent carboxylic acid or its anhydride are initially dispersed in the binding material so as to be dispersed with an organic solvent selected from ether, ester, ketone, aromatic hydrocarbon, aliphatic hydrocarbon and organic chlorine compound solvents so that the magnetic coating material is prepared. Then, the non-magnetic support member is coated with the above-mentioned magnetic coating material, followed by performing a drying process and a calender process so that the magnetic layer is formed.

The side (the reverse side), on which the magnetic layer cannot be formed on the non-magnetic support member, may be provided with a back coating layer in order to improve the cursorial properties of the magnetic recording medium, to prevent electrification and to prevent transference. The back coating layer may contain inorganic non-magnetic powder, a binding material (which is basically the same as the binding material included in the magnetic layer according to the present invention) and various known additives.

The magnetic recording medium according to the present invention includes a magnetic layer formed by coating a non-magnetic support member with a magnetic coating material mainly composed of ferromagnetic iron alloy powder and a binding material, wherein the magnetic coating material includes ferromagnetic iron alloy powder containing Co by 6 to 30 atom %, Y by 1 to 6 atom % and Al by 10 to 15 atom % with respect to Fe and having an average major axis length of 0.06 μm to 0.20 μm, polyvalent carboxylic acid having a molecular weight of 300 or less or an anhydride of the polyvalent carboxylic acid, a binding material, and a lubricant, and the maxim diameter of pores in the magnetic layer is 10 nm to 30 nm.

The magnetic recording medium according to the present invention has the structure in which the ferromagnetic iron alloy powder having an excellent magnetic characteristic and suitable to be used in a short-wavelength recording operation realized by the polyvalent carboxylic acid having a molecular weight of 300 or less or its anhydride having excellent affinity with the ferromagnetic iron alloy powder is dispersed in the binding material. Therefore, the ferromagnetic iron alloy powder can satisfactory be dispersed in the magnetic layer. As a result, the magnetic recording medium according to the present invention has a satisfactory electromagnetic conversion characteristic. Since the maximum diameter of pores in the magnetic layer is ranged as described above, the ferromagnetic iron alloy powder can appropriately be enclosed in the magnetic layer and therefore the magnetic characteristic can be improved. Moreover, the lubricant can sufficiently be supplied to the surface of the magnetic layer so that the durability is improved.

Other objects, features and advantages of the invention will be evident from the following detailed description of the preferred embodiments described in conjunction with the attached drawings.

BRIEF DESCRIPTION OF THE DRAWINGS

The FIGURE is a cross sectional view showing an example of a magnetic recording medium according to the present invention.

DESCRIPTION OF THE PREFERRED EMBODIMENTS

Figure 1:
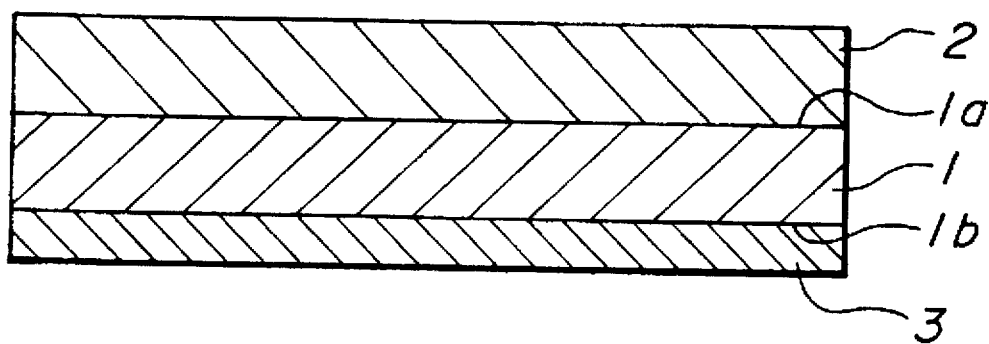

Embodiments of the present invention will now be described in accordance with results of experiments performed such that various magnetic recording mediums respectively having different magnetic coating materials were manufactured so as to examine the electromagnetic conversion characteristic and the durability of the manufactured magnetic recording mediums. That is, magnetic recording mediums were manufactured which were magnetic tapes each having a structure in which a magnetic layer 2 containing ferromagnetic iron alloy powder and polyvalent carboxylic acid having a molecular weight of 300 or less or its anhydride was formed on a main surface 1a of a non-magnetic support member 1 thereof and a back coating layer 3 mainly composed of non-magnetic powder and a binding material is formed on another main surface 1b. The magnetic coating material for forming the magnetic layer 2 was changed so as to examine the electromagnetic conversion characteristic and the durability of the magnetic recording medium.

Example 1

Initially, magnetic coating materials respectively having the following composition were prepared.

<Composition of Magnetic Coating Material>

Ferromagnetic Iron Alloy Powder fine ferromagnetic iron alloy powder a: 100 parts by weight Binding Material polyester type polyurethane resin 1: 10 parts by weight
vinyl chloride copolymer: 10 parts by weight Inorganic Non-magnetic Powder $\alpha\text{-Al}_2\text{O}_3$: 8 parts by weight Dispersing agent (polyvalent carboxylic acid having a molecular weight of 300 or less or its anhydride)

nitrilotriacetic acid (NTA): 3 parts by weight

Lubricant stearic acid: 2 parts by weight
butylstearate: 2 parts by weight

Solvent methylethylketone/toluene/cyclohexane: 100/100/50 parts by weight

The characteristics of the fine ferromagnetic iron alloy powder a, various binding materials and $\alpha\text{-Al}_2\text{O}_3$ are shown in Tables 1 to 3.

TABLE 1

| Fine Ferromagnetic Iron Alloy Powder | Average Major Axis Length [μm] | Ratio of Contained Elements with Respect to Fe [atm %] | | |
|---|---|---|---|---|
| | | Co | Y | Al |
| a | 0.13 | 13.0 | 3.1 | 10.0 |
| b | 0.08 | 10.2 | 2.5 | 9.4 |
| c | 0.18 | 8.1 | 1.0 | 20.3 |
| d | 0.26 | — | — | 9.7 |

TABLE 2

| skelton | Functional Group | |
|---|---|---|
| Vinyl Chloride Copolymer | Epoxy 0.8 mmol/g Sulfuric Acid K 0.07 mmol/g Hydroxy Group 0.3 mmol/g | Average Degree of Polymerization 300 |
| Polyester Polyurethan Resin 1 | Sulfonic Acid Na 0.13 mmol/g | Number-Average Molecular Weight 20500 |
| Polyester Polyurethan Resin 2 | Carboxy Group 0.06 mmol/g | Quantity-Average Molecular Weight 71200 |
| Phenoxy Resin | Hydroxyl Group 3.02 mmol/g | Average Degree of Polimerization 100 |
| Nitrocellulose Resin | Hydroxy Group 3.90 mmol/g | Average Degree of Polimerization 90 |

TABLE 3

| | Particle size [nm] | |
|---|---|---|
| $\alpha\text{-Al}_2\text{O}_3$ | 200 | Specific Surface Area [BET method] 11.1 m²/g |
| Carbon Black | 40 | Quantity of DTP Absorption 112.0 magnetic layer/100 g |

The above-mentioned materials were dispersed by a sand mill, and then 20 parts by weight of polyisocyanate (CORONATE L trade name of Nihon Polyurethane, hardener) were added, and then the obtained material was applied to either of the main surfaces of a base film which was a non-magnetic support member having a thickness of 7.5 μm and made of polyethylene terephthalate.

Then, a process for orienting the magnetic field was performed, and then the material was dried and wound up. Then, the calender process was performed, and then the material was hardened so that the magnetic layer was formed.

Then, 20 parts by weight of polyisocyanate (CORONATE trade name of Nihon Polyurethane, hardener) were added to a coating material for forming the back coating layer having the following composition, and then the obtained material was applied to another main surface of the base film so that a back coating layer having a thickness of 0.6 μm was formed.

<Composition of Coating Material for Forming Back Coating Layer>

Inorganic Non-magnetic Powder carbon black: 100 parts by weight

Binding Material polyester type polyurethane resin 2: 25 parts by weight
phenoxy rein: 65 parts by weight
nitrocellulose resin: 10 parts by weight Solvent methylethylketone: 500 parts by weight
toluene: 500 parts by weight The characteristics of the carbon black and the various binding materials are shown in Tables 2 and 3. A wide tape having a total thickness of 10.5 to 10.7 μm manufactured as described above was cut into sections each having a width of 8 mm and accommodated in an 8 mm cassette which was Example 1.

The electromagnetic conversion characteristic and durability of Example 1 were measured. The electromagnetic conversion characteristic was measured such that an 8 mm video deck capable of recording and reproducing an image in a high quality 8 mm mode was used. In an environment that the temperature was 25° C. and the relative humidity was 60%, signal each having a frequency of 7 MHz is supplied to a portion corresponding to 10 minutes so as to obtain the difference between the output at the frequency of 7 MHz and that at the frequency of 6 MHz so that the S/N ratio was measured. A value obtained from Example 1 was made to be 0 dB to which a reference with each of values of the following samples is made so that the values of the following samples were indicated by the relative values.

The durability was evaluated by examining the durability against a still-image maintaining operation. An 8 mm-video deck modified such that the pause mode can be suspended to be capable of displaying a still image for a long time was used to evaluate the durability by measuring time taken from the initial stage to a moment at which the RF output was decayed by 3 dB in an environment that the temperature was 45° C. and the relative humidity was 80%.

Moreover, the maximum diameter of pores in the magnetic layer of Example 1 was measured by using a mercury pressure insertion type pore distribution measuring apparatus (Pore Sizer 9320) manufactured by Simazu.

The mercury pressure introduction type pore distribution measuring apparatus has an automatic measuring unit and a data processing unit so as to obtain diameters of pores by the following principle. Hereinafter values employed in this specification are those obtained by automatic measurement and automatic calculated by the above-mentioned apparatus.

In accordance with a "Law of Capillary when Fluid Penetrates a Pore", the relationship between non-wet fluid and a pore is expressed by Washburn's equation shows as Equation 1.

$$D = -(1/P) \, 4 \, \gamma \cos \theta \quad (1)$$

where D (μm) was the diameter of the pore, γ (dyne/cm) was the surface tension of non-wet fluid, θ is an angle of contact of the non-wet fluid, and P (psi: pounds per square inches) is the pressure level.

Since mercury was used as the non-wet fluid, γ=485 (dyne/cm) and θ=130. By measuring the introduction pressure P, the diameter of the pore can be obtained.

The measurement was performed by using Example 1 having a width of 8 mm and a length of 2 m. The sample above was introduced into a sample tube provided for the above-mentioned measuring apparatus. Then, the inside portion of the sample tube was vacuum-degassed, and then mercury was injected. Then, the pressure in the sample tube was gradually raised from 0 (psi) to 3000 (psi) so that the accumulated quantity v (i) of the introduced mercury when the introduction pressure was P (i) was measured.

The maximum diameter of the pores can be obtained from a P(i)–Δv curve between the introduction pressure P(i) and the quantity (Δv) of increase of the mercury introduction capacity as introduction pressure P(i) when Δv starts increasing.

The maximum diameter of pores, still-image maintaining period and S/N of Example 1 are shown in Table 4 together with the types of the fine ferromagnetic iron alloy powder, the types of the dispersing agent and the quantity of addition.

TABLE 4

| Examples | Fine Ferromagnetic Powder | dispersing agent | | Maximum Diameter of Pores [nm] | Still Time [min] | S/N [dB] |
| --- | --- | --- | --- | --- | --- | --- |
| | | Type | Quantity | | | |
| 1 | a | NTA | 3 | 21 | 185 | 0 |
| 2 | a | NTA | 3 | 27 | 243 | +0.1 |
| 3 | a | NTA | 3 | 12 | 153 | +0.2 |
| 4 | a | NTA | 1 | 18 | 168 | 0 |
| 5 | a | NTA | 5 | 23 | 203 | 0 |
| 6 | a | citric acid | 3 | 20 | 197 | +0.2 |
| 7 | b | NTA | 3 | 23 | 220 | +0.3 |
| 8 | a | NTA | 0.5 | 23 | 66 | −0.2 |
| 9 | a | NTA | 10 | 12 | 54 | −0.1 |

Examples 2 to 3

The magnetic coating material was prepared such that the ratio of the ferromagnetic iron alloy powder and the binding material in the magnetic coating material was changed. Then, magnetic tapes respectively having the maximum diameters of pores in the magnetic layer as shown in Table 4 were manufactured as Examples 2 and 3 as well as Example 1. Then, the still-image maintaining operation time and the S/N ratio of the magnetic tape were measured as well as Example 1. Results are shown in Table 4 together with the types of the fine ferromagnetic iron alloy powder and the types and quantities of the dispersing agents.

Examples 4 to 6

A magnetic tape was manufactured as well as Example 1 except the quantity of nitrilotriacetic acid which was the polyvalent carboxylic acid having a molecular weight of 300 or less or its anhydride of nitrilotriacetic acid (NTA) being changed to one part by weight, the sample being employed as Example 4. A magnetic tape was manufactured as well as Example 1 except the quantity of nitrilotriacetic acid being changed to 5 parts by weight, the sample being employed as Example 5. A magnetic tape was manufactured as well as Example 1 except the quantity of the polyvalent carboxylic acid having a molecular weight of 300 or less or its anhydride being changed to citric acid and the quantity of the citric acid being 3 parts by weight, the sample being employed as Example 6.

The maximum diameters of pores, still-image maintaining operation time and S/N ratios of Examples 4 to 6 were measured as well as Example 1. Results are shown in Table 4 together with the types of fine ferromagnetic iron alloy powder and the types and quantities of the dispersing agents.

Example 7

A magnetic tape was manufactured as well as Example 1 except the ferromagnetic iron alloy powder being changed to fine ferromagnetic iron alloy powder b, the sample being employed as Example 7. Also the characteristics of ferromagnetic iron alloy powder b are shown in Table 1.

The maximum diameters of pores, still-image maintaining operation time and S/N ratios of Examples 7 were measured as well as Example 1. Results are shown in Table 4 together with the types of fine ferromagnetic iron alloy powder and the types and quantities of the dispersing agents.

Example 8

A magnetic tape was manufactured as well as Example 1 except the quantity of the polyvalent carboxylic acid having a molecular weight of 300 or less or its anhydride being changed to 0.5 part by weight, the sample being employed as Example 8.

The maximum diameters of pores, still-image maintaining operation time and S/N ratios of Examples 8 were measured as well as Example 1. Results are shown in Table 4 together with the types of fine ferromagnetic iron alloy powder and the types and quantities of the dispersing agents.

Example 9

A magnetic tape was manufactured as well as Example 1 except the quantity of the polyvalent carboxylic acid having a molecular weight of 300 or less or its anhydride being changed to 10 parts by weight, the sample being employed as Example 9.

The maximum diameters of pores, still-image maintaining operation time and S/N ratios of Examples 9 were measured as well as Example 1. Results are shown in Table 4 together with the types of fine ferromagnetic iron alloy powder and the types and quantities of the dispersing agents.

Comparative Example 1

A magnetic tape was manufactured as well as Example 1 except the polyvalent carboxylic acid having a molecular weight of 300 or less or its anhydride being changed to lecithin, the sample being employed as Comparative Example 1.

The maximum diameters of pores, still-image maintaining operation time and S/N ratios of Comparative Example 1 were measured as well as Example 1. Results are shown in Table 5 together with the types of fine ferromagnetic iron alloy powder and the types and quantities of the dispersing agents.

TABLE 5

| Comparative Examples | Fine Ferromagnetic Powder | dispersing agent (parts by weight) | | Maximum Diameter of Pores [nm] | Still Time [min] | S/N [dB] |
|---|---|---|---|---|---|---|
| | | Type | Quantity | | | |
| 1 | a | Lecithin | 3 | 28 | 155 | −1.8 |
| 2 | a | NTA | 3 | 5 | 57 | 0 |
| 3 | a | NTA | 3 | 41 | 18 | −0.3 |
| 4 | c | NTA | 3 | 19 | 188 | −1.2 |
| 5 | d | NTA | 3 | 22 | 205 | −2.1 |

Comparative Example 2

A magnetic tape was manufactured as well as Example 1 except the ratio of the ferromagnetic iron alloy powder and the binding material in the magnetic coating material being changed and the maximum diameter of pores in the magnetic layer being changed to a value less than 10 nm, the sample being employed as Comparative Example 2.

The maximum diameters of pores, still-image maintaining operation time and S/N ratios of Comparative Example 2 were measured as well as Example 1. Results are shown in Table 5 together with the types of fine ferromagnetic iron alloy powder and the types and quantities of the dispersing agents.

Comparative Example 3

A magnetic tape was manufactured as well as Example 1 except the ratio of the ferromagnetic iron alloy powder and the binding material in the magnetic coating material being changed and the maximum diameter of pores in the magnetic layer being changed to a value larger than 30 nm, the sample being employed as Comparative Example 3.

The maximum diameters of pores, still-image maintaining operation time and S/N ratios of Comparative Example 3 were measured as well as Example 1. Results are shown in Table 5 together with the types of fine ferromagnetic iron alloy powder and the types and quantities of the dispersing agents.

Comparative Examples 4 and 5

A magnetic tape was manufactured as well as Example 1 except the ferromagnetic iron alloy powder being changed to fine ferromagnetic iron alloy powder c, the sample being employed as Comparative Example 4. A magnetic tape was manufactured as well as Example 1 except the ferromagnetic iron alloy powder being changed to fine ferromagnetic iron alloy powder d, the sample being employed as Comparative Example 5. Also characteristics of the fine ferromagnetic iron alloy powder c and d are shown in Table 1.

The maximum diameters of pores, still-image maintaining operation time and S/N ratios of Comparative Examples 4 and 5 were measured as well as Example 1. Results are shown in Table 5 together with the types of fine ferromagnetic iron alloy powder and the types and quantities of the dispersing agents.

As can be understood from the results shown in Tables 4 and 5, Examples 1 to 9, each of which was a magnetic recording medium including: a magnetic layer formed by coating a non-magnetic support member with a magnetic coating material mainly composed of ferromagnetic iron alloy powder and a binding material, wherein the magnetic coating material includes ferromagnetic iron alloy powder containing Co by 6 to 30 atom %, Y by 1 to 6 atom % and Al by 10 to 15 atom % with respect to Fe and having an average major axis length of 0.06 µm to 0.20 µm, polyvalent (a valence of two or more) carboxylic acid having a molecular weight of 300 or less or an anhydride of the polyvalent carboxylic acid, a binding material, and a lubricant, and the maxim diameter of pores in the magnetic layer is 10 nm to 30 nm. The foregoing examples exhibited satisfactory durability against a still-image maintaining operation and high S/N ratio and therefore have satisfactorily balanced electromagnetic conversion characteristic and the durability as compared with Comparative Examples 1 to 5.

Another fact was confirmed from results of comparison performed between Examples 1 and 7 and Comparative Examples 4 and 5 that use of the fine ferromagnetic metal powder containing Co by 6 to 30 atom %, Y by 1 to 6 atom % and Al by 10 to 15 atom % with respect to Fe as the ferromagnetic iron alloy powder enables the electromagnetic conversion characteristic to be improved because the foregoing fine ferromagnetic metal powder has the excellent magnetic characteristic. Moreover, if fine ferromagnetic iron alloy powder containing the foregoing elements by quantities which are not included in the foregoing range is used, the required electromagnetic conversion characteristic cannot be obtained because the magnetic characteristic of the foregoing fine ferromagnetic iron alloy powder is unsatisfactory.

It is preferable that the average length of the major axes of the ferromagnetic iron alloy powder be in a range from 0.06 to 0.20 µm so as to be used in a short wavelength recording operation.

As can be understood from the results of comparison among Examples 1 and 6 and Comparative Example 1, use of the polyvalent carboxylic acid having a molecular weight of 300 or less or its anhydride as the dispersing agent enables the dispersion properties of the ferromagnetic iron alloy powder in the magnetic coating material to be improved because the affinity between the foregoing carboxylic acid and the binding material is satisfactory. Thus, the electromagnetic conversion characteristic can be improved.

As can be understood from Examples 1, 4, 5, 8 and 9, addition of the polyvalent (a valence of two or more) carboxylic acid having a molecular weight of 300 or less or its anhydride which has a satisfactory affinity with the ferromagnetic iron alloy powder by a quantity of range from 1 to 5 parts by weight with respect to 100 parts by weight of the magnetic powder enables the electromagnetic conversion characteristic to be more improved and thus a satisfactory results being obtained in practical use.

As can be understood from results of Examples 1 to 3 and Comparative Examples 2 and 3, if the maximum diameter of pores in the magnetic layer is 10 to 30 nm, a satisfactory large hole capacity can be realized in the magnetic coat. Thus, the magnetic characteristic can be improved, a satisfactory electromagnetic conversion characteristic can be obtained and the durability against a still-image maintaining operation can be improved. If the maximum diameter of pores in the magnetic layer is less than 10 nm, a sufficiently large hole capacity cannot be obtained and the durability against a still-image maintaining operation deteriorates. If the maximum diameter of pores in the magnetic layer is larger than 30 nm, the magnetic powder cannot sufficiently be enclosed and thus a required magnetic characteristic cannot be obtained. As a result, a satisfactory electromagnetic conversion characteristic cannot be obtained.

As can be understood from the foregoing description, the magnetic recording medium includes a magnetic layer formed by coating a non-magnetic support member with a magnetic coating material mainly composed of ferromagnetic iron alloy powder and a binding material, wherein the magnetic coating material includes ferromagnetic iron alloy powder containing Co by 6 to 30 atom %, Y by 1 to 6 atom % and Al by 10 to 15 atom % with respect to Fe and having an average major axis length of 0.06 μm to 0.20 μm, polyvalent carboxylic acid having a molecular weight of 300 or less or an anhydride of the polyvalent carboxylic acid, a binding material, and a lubricant, and the maxim diameter of pores in the magnetic layer is 10 nm to 30 nm.

The magnetic recording medium according to the present invention has the structure in which the ferromagnetic iron alloy powder having an excellent magnetic characteristic realized by the polyvalent carboxylic acid having a molecular weight of 300 or less or its anhydride having excellent affinity with the ferromagnetic iron alloy powder is dispersed in the binding material. Therefore, the ferromagnetic iron alloy powder can satisfactory be dispersed in the magnetic layer. As a result, the magnetic recording medium according to the present invention has a satisfactory electromagnetic conversion characteristic. Since the maximum diameter of pores in the magnetic layer is ranged as described above, the ferromagnetic iron alloy powder can appropriately be enclosed in the magnetic layer and therefore the magnetic characteristic can be improved. Moreover, the lubricant can sufficiently be supplied to the surface of the magnetic layer so that the durability is improved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording medium comprising:

a magnetic layer formed by coating a non-magnetic support member with a magnetic coating material mainly composed of ferromagnetic iron alloy powder and a binding material, wherein said magnetic coating material includes ferromagnetic iron alloy powder containing Co by 6 to 30 atom %, Y by 1 to 6 atom % and Al by 10 to 15 atom % with respect to Fe and having an average major axis length of 0.06 μm to 0.20 μm, polyvalent carboxylic acid having a molecular weight of 300 or less or an anhydride of said polyvalent carboxylic acid, a binding material and a lubricant, and the maxim diameter of pores in said magnetic layer is 10 nm to 30 nm.

2. A magnetic recording medium according to claim 1, wherein said polyvalent carboxylic acid or said anhydride of said polyvalent carboxylic acid is contained by 1 to 5 parts by weight with respect to 100 parts by weight of said magnetic powder.

* * * * *